(12) United States Patent
Kinoshita et al.

(10) Patent No.: US 9,746,568 B2
(45) Date of Patent: Aug. 29, 2017

(54) METHODS, SYSTEMS AND DEVICES FOR GENERATING SLOWNESS-FREQUENCY PROJECTION LOGS

(71) Applicant: Schlumberger Technology Corporation, Sugar Land, TX (US)

(72) Inventors: Toshihiro Kinoshita, Sagamihara (JP); Hiroaki Yamamoto, Kamakura (JP); Takeshi Fukushima, Hachioji (JP)

(73) Assignee: SCHLUMBERGER TECHNOLOGY CORPORATION, Sugarland, TX (US)

( * ) Notice: Subject to any disclaimer, the term of this patent is extended or adjusted under 35 U.S.C. 154(b) by 295 days.

(21) Appl. No.: 14/341,847

(22) Filed: Jul. 28, 2014

(65) Prior Publication Data

US 2015/0036460 A1 Feb. 5, 2015

Related U.S. Application Data

(60) Provisional application No. 61/862,071, filed on Aug. 4, 2013.

(51) Int. Cl.
*G01V 1/40* (2006.01)
*G01V 1/48* (2006.01)
*G01V 1/34* (2006.01)

(52) U.S. Cl.
CPC .............. *G01V 1/345* (2013.01); *G01V 1/48* (2013.01); *G01V 1/40* (2013.01); *G01V 2210/44* (2013.01); *G01V 2210/46* (2013.01); *G01V 2210/47* (2013.01); *G01V 2210/74* (2013.01)

(58) Field of Classification Search
CPC ..... G01V 1/50; G01V 1/44; G01V 1/48; G01V 1/345; G01V 2210/44
USPC .......................................................... 367/31
See application file for complete search history.

(56) References Cited

U.S. PATENT DOCUMENTS 7,643,374 B2    1/2010   Plona et al.

FOREIGN PATENT DOCUMENTS

GB        2486336        6/2012

OTHER PUBLICATIONS

Plona et al., "Slowness-Frequency Projection Logs: aA new QC method for accurate sonic slowness evaluation", SPWLA 46th Annual Logging Symposium, Jun. 26-29, 2005.*

(Continued)

*Primary Examiner* — Ian J Lobo

(57) ABSTRACT

An example method for displaying sonic logging data associated with a formation surrounding a borehole can include acquiring sonic data at a plurality of depths using an acoustic array located in the borehole and transforming the acquired sonic data from a time-space domain to a frequency-wave number domain at a limited number of discrete frequencies. The method can also include estimating slowness values at the limited number of discrete frequencies from the transformed sonic data, interpolating the estimated slowness values to obtain a projection of one or more slowness-frequency dispersions of the acquired sonic data and displaying the projection of the slowness-frequency dispersions. The projection of the slowness-frequency dispersions can include a plurality of color bands corresponding to each of the limited number of discrete frequencies.

19 Claims, 5 Drawing Sheets

(56) References Cited

OTHER PUBLICATIONS

M.P. Ekstrom, "Dispersion Estimation from Borehole Acoustic Arrays Using a Modified Matrix Pencil Algorithm," 1996, IEEE, Proceedings of ASILOMAR-29, pp. 449-453.
Extended search report for the equivalent European patent application No. 14179535.1 issued on Nov. 5, 2015.
Lang et al., Estimating Slowness Dispersion from Arrays of Sonic Logging Waveforms, Geophysics, vol. 52, No. 4, Apr. 1987, pp. 530-544.
Office Action No. 93465 issued in corresponding Mexican application MX/a/2014/009407 on Nov. 24, 2016, 5 pages.

* cited by examiner

Acquire sonic data at a plurality of depths using an acoustic array located in a borehole
302

Transform the acquired sonic data from a time-space domain to a frequency-wave number domain at a limited number of discrete frequencies
304

Estimate slowness values at the limited number of discrete frequencies from the transformed sonic data
306

Interpolate the estimated slowness values to obtain a projection of one or more slowness-frequency dispersions of the acquired sonic data
308

Display the projection of the slowness-frequency dispersions
310

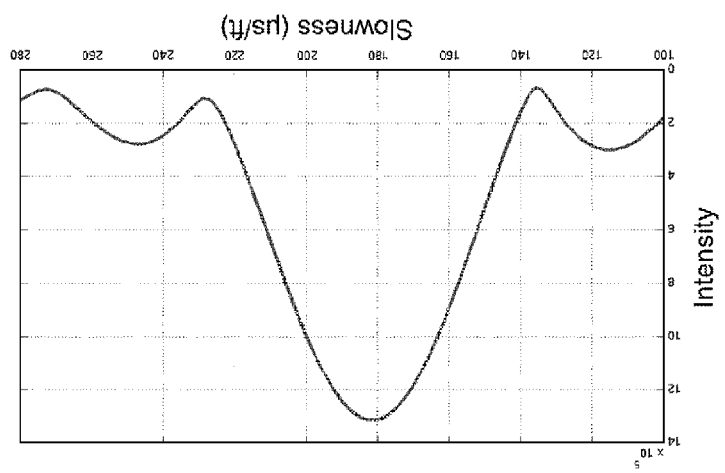
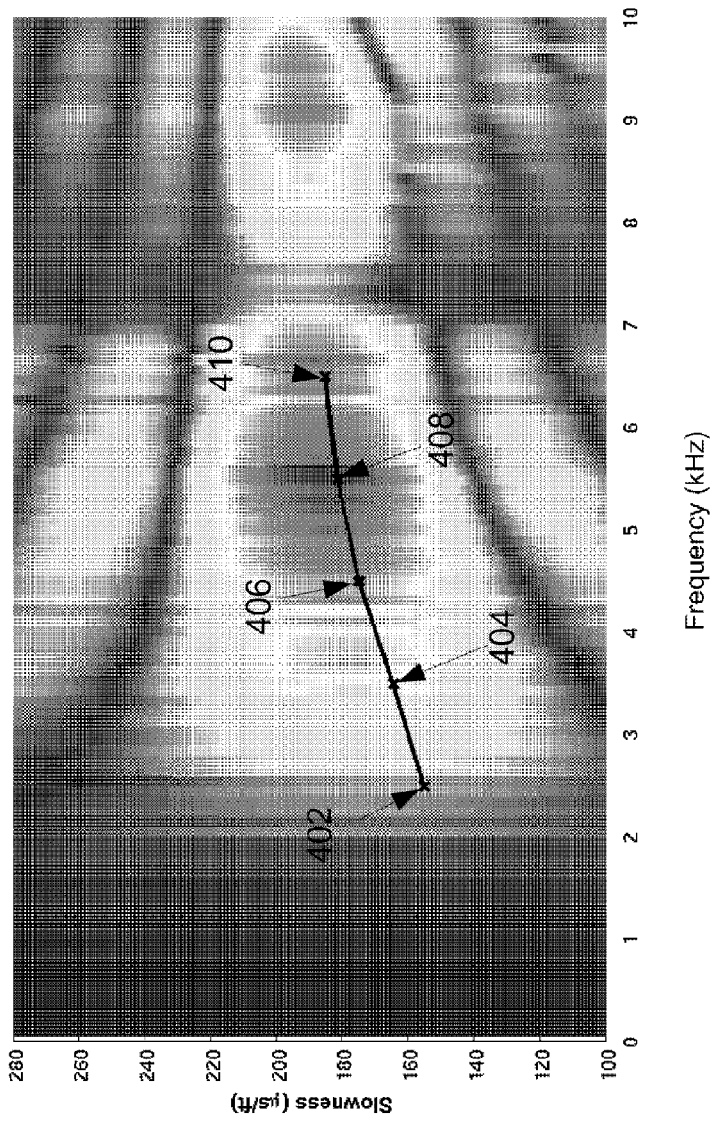
FIG. 4B
FIG. 4A

METHODS, SYSTEMS AND DEVICES FOR GENERATING SLOWNESS-FREQUENCY PROJECTION LOGS

BACKGROUND

Processing monopole headwaves for compressional and shear slowness values is a well-established service for Logging While Drilling ("LWD") sonic logging and wireline sonic logging. Propagation speed of monopole headwaves is essentially constant over a wide frequency band. On the other hand, propagation speed of borehole modes such as leaky-p, borehole flexural and borehole quadrupole modes change as a function of frequency. These modes are therefore known as dispersive modes. It is well-known that dispersion curves contain information about physical properties of formations surrounding the borehole.

Slowness-Frequency Analysis ("SFA") is widely used as a visual quality-control ("QC") for post-processing of the recorded LWD sonic logging data or well-site processing for wireline sonic logging data. According to conventional SFA techniques, the dispersions are first extracted/calculated from the measured waveforms using a modified matrix pencil algorithm, for example, which is described in detail in Ekstrom, M. P., Dispersion Estimation From Borehole Acoustic Arrays Using a Modified Matrix Pencil Algorithm: 29th Asilomar Conference on Signals, Systems, and Computers (1995). Then, the dispersions are projected onto the slowness axis. These techniques are well-known in the art. For example, conventional SFA techniques are described in U.S. Pat. No. 7,643,374, entitled "SLOWNESS-FREQUENCY PROJECTION DISPLAY AND ANIMATION." It should be understood that conventional SFA techniques are computationally expensive, requiring a large number of operations to extract the dispersions.

SUMMARY

Methods, systems and devices for generating slowness-frequency projection logs are described herein. The methods, systems and devices described herein require much less computing power and much less bandwidth for data transmission as compared to the conventional techniques described above. According to the methods, systems and devices described herein, slowness values are computed from measured sonic data at a limited number of discrete frequencies instead of computing slowness dispersions over the entire frequency range. Thereafter, slowness-frequency dispersions are generated by interpolating the computed slowness values to obtain a projection of the slowness-frequency dispersions. The projection of the slowness-frequency dispersions can then be displayed to provide a QC indicator. According to these techniques, it is possible to provide reliable, real-time QC even in situations where computing power and/or bandwidth are limited.

An example method for displaying sonic logging data associated with a formation surrounding a borehole can include acquiring sonic data at a plurality of depths using an acoustic array located in the borehole and transforming the acquired sonic data from a time-space domain to a frequency-wave number domain at a limited number of discrete frequencies. The method can also include estimating slowness values at the limited number of discrete frequencies from the transformed sonic data, interpolating the estimated slowness values to obtain a projection of one or more slowness-frequency dispersions of the acquired sonic data and displaying the projection of the slowness-frequency dispersions. The projection of the slowness-frequency dispersions can include a plurality of color bands corresponding to each of the limited number of discrete frequencies.

Optionally, the limited number of discrete frequencies is no more than two discrete frequencies. Alternatively, the limited number of discrete frequencies is optionally greater than two discrete frequencies.

Alternatively or additionally, an energy distribution as a function of frequency and wave number is calculated by transforming the acquired sonic data from a time-space domain to a frequency-wave number domain. Optionally, the sonic data is transformed from the time-space domain to the frequency-wave number domain using a two-dimensional Fast Fourier Transform ("2D-FFT"). Alternatively or additionally, the sonic data is transformed from the time-space domain to the frequency-wave number domain using a frequency domain Radon transform.

In addition, the slowness values at the limited number of discrete frequencies are optionally estimated from the transformed sonic data based on a relationship between slowness, wave number and frequency. For example, the relationship can be defined by $s=k/f$ where s is slowness, k is wave number and f is frequency.

Optionally, the method can further include transmitting the estimated slowness values from a first computing device to a second computing device before performing at least one of interpolation of the estimated slowness values and display of the projection of the slowness-frequency dispersions. For example, the first computing device can optionally be located in the borehole, and the second computing device can optionally be located on a surface of the formation.

Alternatively or additionally, the method can optionally include displaying the projection of the slowness-frequency dispersions overlaid on a compressional or shear slowness log.

In addition, a width of each of the color bands can indicate a slowness dispersiveness of an acoustic mode. Alternatively or additionally, color variation of the color bands can indicate variability of the slowness-frequency dispersions depending on frequency.

Optionally, the acquired sonic data can include at least one of leaky-p, borehole flexural and borehole multipole dispersive modes.

An example system for displaying sonic logging data associated with a formation surrounding a borehole can include an acoustic array for acquiring sonic data at a plurality of depths, at least one computing device and a display device in communication with the computing device. The acoustic array can be located in the borehole. Additionally, the computing device can be configured to receive the acquired sonic data, transform the acquired sonic data from a time-space domain to a frequency-wave number domain at a limited number of discrete frequencies, estimate slowness values at the limited number of discrete frequencies from the transformed sonic data and interpolate the estimated slowness values to obtain a projection of one or more slowness-frequency dispersions of the acquired sonic data. Further, the display device can display the projection of the slowness-frequency dispersions. The projection of the slowness-frequency dispersions can include a plurality of color bands corresponding to each of the limited number of discrete frequencies.

Optionally, the limited number of discrete frequencies is no more than two discrete frequencies. Alternatively, the limited number of discrete frequencies is optionally greater than or equal to two discrete frequencies.

Alternatively or additionally, an energy distribution as a function of frequency and wave number is calculated by transforming the acquired sonic data from a time-space domain to a frequency-wave number domain. Optionally, the sonic data is transformed from the time-space domain to the frequency-wave number domain using a two-dimensional Fast Fourier Transform ("2D-FFT"). Alternatively or additionally, the sonic data is transformed from the time-space domain to the frequency-wave number domain using a frequency domain Radon transform.

The slowness values at the limited number of discrete frequencies are optionally estimated from the transformed sonic data based on a relationship between slowness, wave number and frequency. For example, the relationship can be defined by $$s = \frac{k}{f}$$

where s is slowness, k is wave number and f is frequency.

In addition, a width of each of the color bands can indicate a slowness dispersiveness of an acoustic mode. Alternatively or additionally, color variation of the color bands can indicate variability of the slowness-frequency dispersions depending on frequency.

Optionally, the display device displays the projection of the slowness-frequency dispersions overlaid on a compressional or shear slowness log.

In some implementations, the computing device is located in the borehole. Additionally, the display device is located on a surface of the formation.

In other implementations, the system further includes a first computing device located in the borehole and a second computing device located on a surface of the formation. The first computing device can be configured to receive the acquired sonic data, transform the acquired sonic data from a time-space domain to a frequency-wave number domain at a limited number of discrete frequencies, estimate slowness values at the limited number of discrete frequencies from the transformed sonic data and transmit the estimated slowness values to the second computing device. The second computing device can be configured to interpolate the estimated slowness values to obtain a projection of one or more slowness-frequency dispersions of the acquired sonic data. Additionally, the display device is located on the surface of the formation.

In yet other implementations, the computing device and the display device are located on a surface of the formation.

Optionally, the system can further include an acoustic source for generating the acoustic data. The acoustic source can be at least one of monopole acoustic sources, a dipole acoustic source and a multipole acoustic source.

It should be understood that the above-described subject matter may be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

FIG. 3 is a flow chart illustrating example operations for generating slowness-frequency projection logs;

FIG. 4A is a graph illustrating an example energy distribution over the frequency-slowness plane;

FIG. 4B is a graph illustrating an energy distribution as a function slowness at a select frequency.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described for generating slowness-frequency projection logs in LWD sonic logging applications, it will become evident to those skilled in the art that the implementations are not limited thereto, but are applicable for generating slowness-frequency projection logs in other applications such as recorded mode sonic processing and wire-line sonic logging applications.

As discussed above, methods, systems and devices for generating slowness-frequency projection logs are described herein. Slowness values are computed from measured sonic data at a limited number of discrete frequencies (e.g., at two or more discrete frequencies) instead of computing slowness dispersions over the entire frequency range. To compute slowness values at a limited number of discrete frequencies, the measured sonic data is transformed from the time-space domain into the frequency-wave number domain. The sonic data in the frequency-wave number domain is then converted to the frequency-slowness domain. Thereafter, the slowness-frequency dispersions are generated by interpolating the computed slowness values to obtain a projection of the slowness-frequency dispersions. The projection of the slowness-frequency dispersions can then be displayed to provide a QC indicator. These methods, systems and devices require much less computing power and much less bandwidth for data transmission as compared to the conventional techniques. Accordingly, it is possible to provide reliable, real-time QC even in situations where computing power and/or bandwidth are limited.

Figure 1:
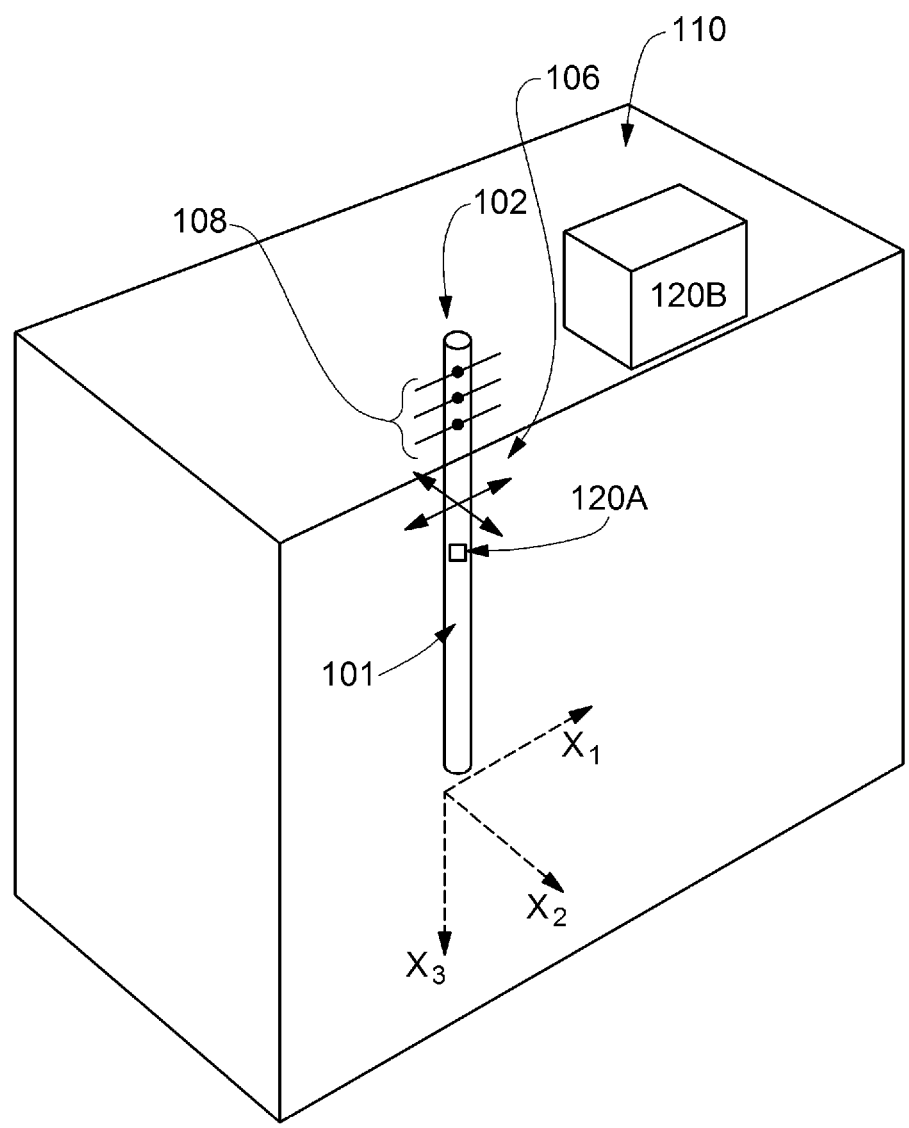
FIG. 1 is a schematic diagram illustrating a borehole in a formation.

Referring now to FIG. 1, a schematic diagram of a borehole (or wellbore) 102 in a formation 110 is shown. The formation 110 can contain a desirable fluid such as oil or gas. As shown in FIG. 1, the borehole 102 is a vertical wellbore (e.g., parallel to the $X_3$-axis) drilled in the formation 110. Although a vertical wellbore is shown in FIG. 1 as an example, it should be understood that the borehole 102 can optionally be a deviated or horizontal wellbore. The borehole 102 can be used to extract the desirable fluid. Optionally, the borehole 102 can be a fluid-filled wellbore, e.g., filled with a drilling fluid 101. The borehole 102 can have an acoustic tool arranged therein. An acoustic tool (or logging tool, sonic tool, etc.) can include at least one acoustic source 106 and an array of acoustic receivers 108 (e.g., an acoustic array). The acoustic source 106 and the array of acoustic receivers 108 can be part of an acoustic logging tool of any type, including but not limited to, a wire-line logging tool, a LWD tool or a measurement while drilling ("MWD") tool. Logging tools are well known in the art and are therefore not discussed in further detail below.

The acoustic source 106 can be configured to excite monopole or dipole acoustic modes or other multipole acoustic modes. It should be understood that the acoustic source 106 is configured to transmit energy (e.g., acoustic waves) into the formation 110. The energy can be characterized by its frequency and wavelength. Optionally, the acoustic source 106 can transmit broadband energy at frequencies between 0.5 and 20 kHz, for example. The transmitted energy can excite compressional, shear, Stoneley, flexural and/or multipole waves in the formation 110. Additionally, the array of acoustic receivers 108 is configured to detect the compressional, shear, Stoneley, flexural or multipole waves travelling in the drilling fluid 101, for example. It should be understood that the energy transmitted by the acoustic source 106 can be reflected and/or refracted from the fluid-formation interface. The array of acoustic receivers 108 can optionally include a plurality of acoustic receivers. By arranging acoustic receivers in an array with different spacing from the acoustic source 106, it is possible to improve signal quality and extract various borehole signals over a broad frequency band. In addition, it should be understood that the borehole 102, as well as the acoustic source 106 and the array of acoustic receivers 108, are provided only as examples and are not intended to be limiting.

The acoustic tool (e.g., the acoustic source 106 and the array of acoustic receivers 108) can be operably connected with one or more computing devices. As described in detail below, computing device 120A can be located in the borehole, e.g., computing device 120A can be integrated with the acoustic tool. Alternatively or additionally, computing device 120B can optionally be located above, on and/or below the surface of the formation 110. Optionally, when there is more than one computing device (e.g., when both computing devices 120A and 120B are provided), the computing devices can be operably connected, and each computing device can be configured to perform some or all of the operations described below for generating slowness-frequency projection logs. The computing devices can optionally be configured to control the acoustic source 106 and/or the array of acoustic receivers 108, as well as receive, process and store sonic data (e.g., the acoustic data detected, collect, recorded, etc. by the acoustic receivers 108). In its most basic configuration, each computing device typically includes at least one processing unit and system memory. Depending on the exact configuration and type of computing device, system memory may be volatile (such as random access memory (RAM)), non-volatile (such as read-only memory (ROM), flash memory, etc.), or some combination of the two. The processing unit can be a standard programmable processor that performs arithmetic and logic operations necessary for operation of the computing devices.

For example, the processing unit can be configured to execute program code encoded in tangible, computer-readable media. Computer-readable media refers to any media that is capable of providing data that causes the computing devices (i.e., a machine) to operate in a particular fashion. Various computer-readable media may be utilized to provide instructions to the processing unit for execution. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In addition, each computing device can have additional features/functionality. For example, the computing devices may include additional storage such as removable storage and non-removable storage including, but not limited to, magnetic or optical disks or tapes. The computing devices may also contain network connection(s) that allow the device to communicate with other devices. The computing devices may also have input device(s) such as a keyboard, mouse, touch screen, etc. Output device(s) such as a display, speakers, printer, etc. may also be included. The additional devices may be connected to the bus in order to facilitate communication of data among the components of the computing devices. All these devices are well known in the art and need not be discussed at length here.

Figure 2A:
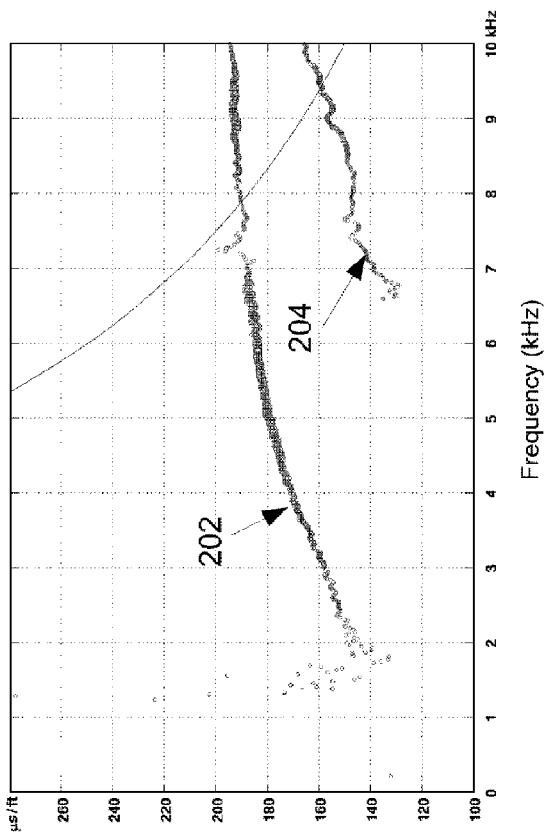
FIG. 2A is a graph illustrating example leaky-p waveforms measured by an acoustic array.
Figure 2B:
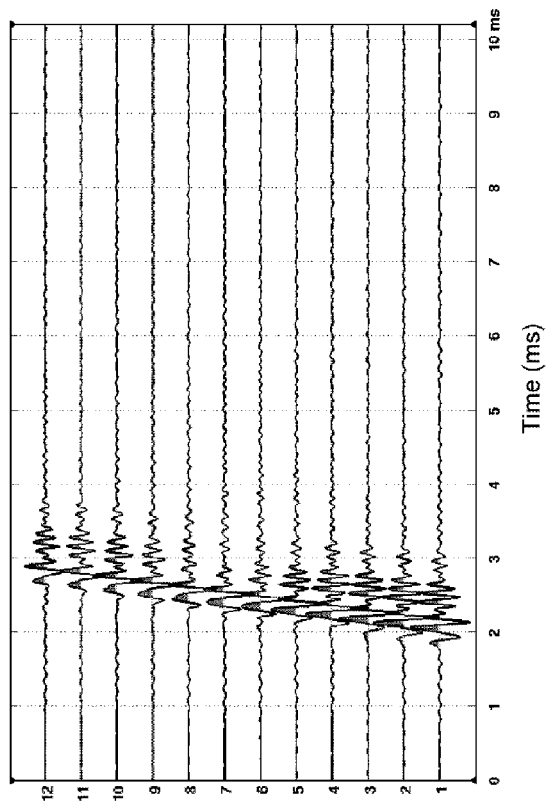
FIG. 2B is a graph illustrating example slowness-frequency dispersions extracted from the waveforms of FIG. 2A using a modified matrix pencil algorithm.

In addition to performing conventional monopole P&S, it can be desirable to process dispersive modes or waves (e.g., leaky-p, borehole flexural and/or borehole multipole modes) at downhole (e.g., at the acoustic tool located in the borehole) in real-time to facilitate timely decision-making for borehole stability and well placement. It should be understood, however, that processing of such dispersive modes can be more complex than performing conventional monopole P&S and can result in more ambiguity and/or errors. It is therefore desirable to provide reliable, real-time, visual QC indicators when using information obtained by processing the dispersive modes. As discussed above, conventional techniques to provide QC indicators such as SFA are computationally expensive. Referring now to FIG. 2A, a graph illustrating example leaky-p waveforms measured by an acoustic array is shown. The leaky-p waveforms can be measured using the acoustic array shown in FIG. 1, for example. Slowness-frequency dispersions can be extracted using a modified matrix-pencil algorithm, for example. A graph illustrating example slowness-frequency dispersions extracted from the waveforms of FIG. 2A using a modified matrix pencil algorithm is shown in FIG. 2B. A low frequency asymptote of the first order mode 202 indicates the formation compressional slowness. Additionally, the second order mode 204 can be seen at approximately 6.5 kHz and above. A low frequency asymptote of the second order mode also indicates the formation compressional slowness.

In LWD sonic logging applications, lower computing capability and limited bandwidth can make it difficult to provide QC indicators, particularly in real-time. For example, the computing power of a computing device located in the borehole (e.g., incorporated in the acoustic tool) is typically much less than the computing power of a computing device employed at the surface of the formation. This makes it practically difficult to provide conventional QC indicators, for example using conventional SFA techniques, using a computing device located in the borehole. Additionally, bandwidth between the acoustic tool located in the borehole and the surface of the formation is limited. This makes it practically difficult to send sonic data (e.g., waveform data) from the acoustic tool to the surface of the formation due to the limited bandwidth telemetry, which hinders the ability to provide QC indicators using conventional techniques with a computing device located at the surface of the formation in real-time.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Referring now to FIG. 3, a flow diagram illustrating example operations 300 for generating slowness-frequency projection logs is shown. It should be understood that the example operations 300 can be implemented using the acoustic source 106, the array of acoustic receivers 108 and computing device 120A and/or computing device 120B shown in FIG. 1, for example. At 302, sonic data is acquired at a plurality of depths using an acoustic array located in a borehole (e.g., acoustic receivers 108 of FIG. 1). It should be understood that acoustic waves can be generated using an acoustic source (e.g., acoustic source 106 of FIG. 1). The acoustic source can be one or more monopole, dipole and/or multipole acoustic sources. Additionally, the acquired sonic data can include dispersive modes such as leaky-p, borehole flexural and borehole multipole modes. At 304, the acquired sonic data is transformed from a time-space domain to a frequency-wave number domain at a limited number of discrete frequencies. For example, the limited number of discrete frequencies can be no more than two discrete frequencies. Alternatively, the limited number of discrete frequencies can optionally be greater than two, three or four discrete frequencies. Alternatively or additionally, the limited number of discrete frequencies can optionally be less than or equal to five discrete frequencies. It should be understood that the limited number of discrete frequencies provided above are only examples and that the limited number of discrete frequencies can optionally be greater than five discrete frequencies.

By transforming the acquired sonic data from a time-space domain to a frequency-wave number domain, an energy distribution as a function of frequency and wave number is calculated. Optionally, the sonic data is transformed from the time-space domain to the frequency-wave number domain using a two-dimensional Fast Fourier Transform ("2D-FFT"). Alternatively or additionally, the sonic data is transformed from the time-space domain to the frequency-wave number domain using a frequency domain Radon transform. It should be understood that the 2D-FFT and Radon transform are provided only as examples and that other known transforms can be used. At 306, slowness values at the limited number of discrete frequencies are estimated from the transformed sonic data. The slowness values at the limited number of discrete frequencies are optionally estimated from the transformed sonic data (e.g., sonic data in the frequency-wave number domain) based on a relationship between slowness, wave number and frequency. For example, the relationship can be defined by Eqn. (1) below.

$$s = \frac{k}{f} \quad (1)$$

where s is slowness, k is wave number and f is frequency. In other words, the wave numbers can be converted to slowness values because wave numbers are related to slowness values by frequency. A graph illustrating an example energy distribution over a frequency-slowness plane is shown in FIG. 4A. The graph illustrates the energy distribution with color variation over a frequency band between 0 and 10 kHz. As shown in FIG. 4A, the energy distribution is calculated over the entire slowness range and the entire frequency range. FIG. 4A is provided only as an example. This disclosure contemplates that the energy distribution over the frequency-slowness plane can be calculated at a limited number of discrete frequencies according to steps 302-306 described above as opposed to over the entire frequency range. A graph illustrating an energy distribution as a function slowness at a select frequency (e.g., 5 kHz) is shown in FIG. 4B. In FIG. 4B, the peak energy distribution at 5 kHz corresponds to a slowness of approximately 180 μs/ft. It should be understood that it is possible to identify the peak energy distribution at one or more discrete frequencies (e.g., 2.5, 3.5, 4.5, 5.5 and 6.5 kHz). The corresponding slowness at the peak energy distribution for each of the one or more discrete frequencies is plotted as markers 402, 404, 406, 408 and 410 in FIG. 4A. A line connecting these markers in FIG. 4A indicates the dispersive features of the mode, which is similar to the dispersion extracted using a modified matrix pencil algorithm shown in FIG. 2B.

Optionally, the estimated slowness values at the limited number of discrete frequencies can be transmitted, for example between a computing device located in the borehole (e.g., computing device 120A of FIG. 1) and a computing device located on the surface of the formation (e.g., computing device 120B of FIG. 1), before further processing. By transforming the acquired sonic data from a time-spaced domain to a frequency-wave number domain and estimating slowness values at the limited number of discrete frequencies, it is possible to reduce the computing cost as compared to extracting dispersions according to conventional techniques such as the modified matrix pencil algorithm. This facilitates the ability of a computing device with limited computing power (e.g., a computing device incorporated in an acoustic tool located in a borehole) to perform these processing steps. Further, in addition to having limited computing power, a computing device incorporated in an acoustic tool is required to perform these processing steps within a limited time period, for example, the time period between firings of an acoustic source. Therefore, reducing the computing cost also facilitates the ability of the computing device to perform these processing steps within the limited time period. Additionally, as discussed above, the communication link between the acoustic tool and the surface of the formation is typically bandwidth limited. By reducing the amount of transmitted data (e.g., slowness values at the limited number of discrete frequencies) as compared to transmitting the waveform data, it is possible to facilitate providing real-time QC indicators. Although LWD sonic logging applications are described above, where the slowness values at the limited number of discrete frequencies are transmitted before further processing, this disclosure contemplates performing all of the steps for generating slowness-frequency projection logs with one or more computing devices without intermediate data transmission. For example, it is possible to perform all of the steps for generating slowness-frequency projection logs with one or more computing devices on the surface of the formation during LWD sonic logging applications or with one or more computing devices during wire-line sonic logging applications. In these cases, the computing cost and size of data transmission is reduced as compared to conventional techniques.

Referring again to FIG. 3, the estimated slowness values at the limited number of discrete frequencies are interpolated to obtain a projection of one or more slowness-frequency dispersions of the acquired sonic data at 308. In other words, the projection of the slowness-frequency dispersions can be reproduced by interpolating between the estimated slowness values. As discussed above, step 308 can optionally be performed by a computing device located on the surface of the formation (e.g., computing device 120B of FIG. 1) after receiving the estimated slowness values. Then, at 310, the projection of the slowness-frequency dispersions (e.g., a slowness-frequency projection log) is displayed, for example, on a display device.

Figure 5:
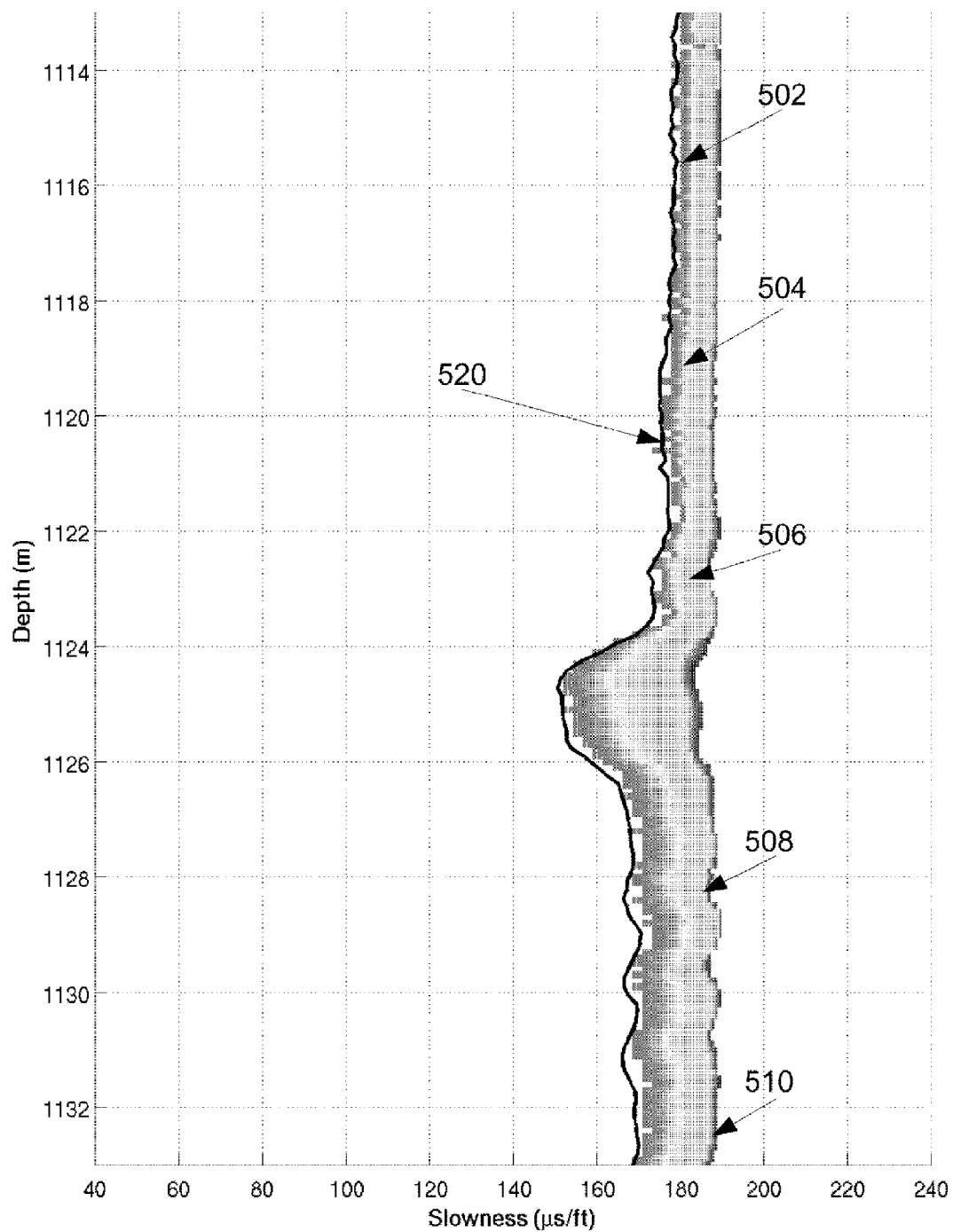
FIG. 5 is a graph illustrating an example slowness-frequency projection log.

A graph illustrating an example slowness-frequency projection log is shown in FIG. 5. The projection of the slowness-frequency dispersions can include a plurality of color bands 502, 504, 506, 508 and 510 corresponding to each of the limited number of discrete frequencies. In FIG. 5, different colors are assigned to different discrete frequencies according to Table 1 below.

TABLE 1

| Frequency (kHz) | Color | Reference No. |
| --- | --- | --- |
| 2.5 | Red | 502 |
| 3.5 | Yellow | 504 |
| 4.5 | Green | 506 |
| 5.5 | Cyan | 508 |
| 6.5 | Blue | 510 |

It should be understood that the limited number of discrete frequencies and the assigned colors are provided as examples only and that more or fewer discrete frequencies and different assigned colors can be used. A width of each of the color bands can indicate a slowness dispersiveness of an acoustic mode. Alternatively or additionally, color variation of the color bands can indicate variability of the slowness-frequency dispersions depending on frequency. As shown in FIG. 5, the measured waves are less dispersive above 1124 m (e.g., depths less than 1124 m) because width of the slowness-frequency projection is relatively narrow at these depths. In addition, the measured waves become more dispersive in the deeper zone (e.g., depths greater than 1124 m).

Optionally, compressional or shear slowness logs can be estimated from the acquired sonic data according to any known technique. The projection of the slowness-frequency dispersions can optionally be displayed or overlaid on the compressional or shear slowness logs. When the techniques described herein are applied to a leaky-p mode, the projection of the slowness-frequency dispersions provides a QC indicator of compressional slowness. When the techniques described herein are applied to a multipole mode, the projection of the slowness-frequency dispersions provides a QC indicator of shear slowness. In FIG. 5, the estimated compressional slowness log is shown by line 520. It should be understood that the slowness-frequency projection log provides a QC indicator for the estimated compressional slowness log. For example, when the estimated compressional slowness log matches the zero-frequency limit of the projection, the estimated compressional slowness is accurate. However, when the estimated compressional slowness log crosses the projection, the estimated compressional slowness is inaccurate. As shown in FIG. 5, the estimated compressional slowness 520 is located slightly to the left of the color bands 502-510. This means that the estimated compressional slowness is accurate. Thus, the compressional slowness obtained from the sonic data properly picks up the low frequency asymptote of the dispersive mode.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for displaying sonic logging data associated with a formation surrounding a borehole, comprising:
   acquiring sonic data with a time-space domain at a plurality of depths using an acoustic array located in the borehole;
   transforming the acquired sonic data from the time-space domain to a frequency-wave number domain;
   estimating slowness values at two or more discrete frequencies from the transformed sonic data;
   sending the estimated slowness values to a surface of the formation;
   interpolating the estimated slowness values to obtain a projection of one or more slowness-frequency dispersions of the acquired sonic data; and
   displaying the projection of the slowness-frequency dispersions, wherein the projection of the slowness-frequency dispersions comprises a plurality of color bands corresponding to each of the two or more discrete frequencies.

2. The method of claim 1, wherein transforming the acquired sonic data from the time-space domain to the frequency-wave number domain calculates an energy distribution as a function of frequency and wave number at the two or more discrete frequencies, and wherein the estimating slowness values at the two or more discrete frequencies from the transformed sonic data comprises identifying the estimated slowness values based on the wave number corresponding to each peak energy distribution.

3. The method of claim 1, wherein the sonic data is transformed from the time-space domain to the frequency-wave number domain using a two-dimensional Fast Fourier Transform ("2D-FFT").

4. The method of claim 1, wherein the sonic data is transformed from the time-space domain to the frequency-wave number domain using a frequency domain Radon transform.

5. The method of claim 1, wherein the estimated slowness values at the two or more discrete frequencies are estimated from the transformed sonic data based on a relationship between slowness, wave number and frequency.

6. The method of claim 1, further comprising transmitting the estimated slowness values from a first computing device to a second computing device before at least one of interpolating the estimated slowness values and displaying the projection of the slowness-frequency dispersions.

7. The method of claim 1, further comprising displaying the projection of the slowness-frequency dispersions overlaid on a compressional or shear slowness log.

8. The method of claim 1, wherein a width of each of the color bands indicates a slowness dispersiveness of an acoustic mode.

9. The method of claim 1, wherein color variation of the color bands indicates variability of the slowness-frequency dispersions depending on frequency.

10. The method of claim 1, wherein the acquired sonic data comprises at least one of leaky-p, borehole flexural and borehole multipole dispersive modes.

11. A system for displaying sonic logging data associated with a formation surrounding a borehole, comprising:
an acoustic array for acquiring sonic data with a time-space domain at a plurality of depths, the acoustic array being located in the borehole;
at least one computing device comprising a first computing device located in the borehole and a second computing device located on a surface of the formation, wherein the first computing device configured to:
receive the acquired sonic data,
transform the acquired sonic data from the time-space domain to a frequency-wave number domain,
estimate slowness values at two or more discrete frequencies from the transformed sonic data, and
transmit the estimated slowness values to the second computing device, and
wherein the second computing device configured to:
interpolate the estimated slowness values to obtain a projection of one or more slowness-frequency dispersions of the acquired sonic data; and
a display device in communication with the at least one computing device, wherein the display device displays the projection of the slowness-frequency dispersions, the projection of the slowness-frequency dispersions comprising a plurality of color bands corresponding to each of the two or more discrete frequencies.

12. The system of claim 11, wherein the sonic data is transformed from the time-space domain to the frequency-wave number domain using a two-dimensional Fast Fourier Transform ("2D-FFT").

13. The system of claim 11, wherein the sonic data is transformed from the time-space domain to the frequency-wave number domain using a frequency domain Radon transform.

14. The system of claim 11, wherein a width of each of the color bands indicates a slowness dispersiveness of an acoustic mode and color variation of the color bands indicates variability of the slowness-frequency dispersions depending on frequency.

15. The system of claim 11, wherein the display device displays the projection of the slowness-frequency dispersions overlaid on a compressional or shear slowness log.

16. The system of claim 11, wherein the at least one computing device is located in the borehole.

17. The system of claim 16, wherein the display device is located on a surface of the formation.

18. The system of claim 11, wherein the at least one computing device and the display device are located on a surface of the formation.

19. The system of claim 11, further comprising an acoustic source for generating the acoustic data, wherein the acoustic source is at least one of monopole acoustic sources, a dipole acoustic source and another multipole acoustic source.

* * * * *